3,666,576
EXPLOSIVE COMPOSITION CONTAINING AN
ENERGETIC ACRYLATE AS BINDER

Lawrence J. Engel, Green Brook, N.J., assignor to the United States of America as represented by the Secretary of the Army No Drawing. Continuation-in-part of application Ser. No. 671,165, Sept. 27, 1967. This application Apr. 30, 1970, Ser. No. 43,619

Int. Cl. C06b 11/00

U.S. Cl. 149—19                     9 Claims

ABSTRACT OF THE DISCLOSURE

An improved energetic propellant charge, of the solid type useful in rockets and rocket motors may be formulated with a system of the polymer of tetrakis(difluoramino)amyl methacrylate and a large amount of hexakis(difluoramino)propyl ether if trimethylolpropane trimethacrylate and a peroxidic polymerization catalyst such as dicyanobenzoyl peroxide are used to crosslink the tetrakis(difluoramino)amyl methacrylate from which the polymer is derived.

CROSS REFERENCE TO RELATED APPLICATION

This application is a continuation-in-part copending application Ser. No. 671,165, filed Sept. 27, 1967 and now abandoned.

BACKGROUND OF THE INVENTION

This invention relates to an energetic propellant composition, and particularly to one of the acrylate type.

Modern military operations are becoming more dependent upon rocket motors. The very nature of the operations require a motor that will give high and reliable performance so that lives will not be lost. A rocket motor is heavily dependent upon a reliable propellant. A solid propellant motor is most reliable since, once ignited, it will continue to burn until it is consumed. As the usefulness of a propellant is dependent upon the intensity of thrust created by its combustion and the consistent reproducibility of said thrust, it has long been the objective of those engaged in the art to find a means of increasing the thrust by means of energetic solid propellant compositions. This invention provides an energetic solid propellant composition that is capable of high and reliable performance.

The polymer used as the propellant binder must result in a propellant composition with certain mechanical and chemical properties. Among some of the more important mechanical properties are: elongation at maximum stress and at break; stress at the maximum of stress-strain curve; tensile strength; tear strength; and elastic recovery when the stress is removed. Since the polymeric binder and oxidizer are in intimate contact with each other and may be exposed to elevated temperatures for prolonged storage periods, it is important that the polymeric binder and oxidizer possess good mutual chemical stabilities toward each other.

The use of a peroxidic curing catalyst is well known in the art of propellant compositions. It is also known, but not as generally, that the curing catalyst assumes roles beyond that of crosslinking molecules containing the alkenic linkage. An undesirable side reaction of the curing catalyst is the promotion of the degradation of the cured propellant, probably by oxidative degradation of the polymerized fuel binder. As a consequence of these harmful degradations, the quantity of curing catalyst used to aid in the cure of the propellant should be held to the minimum, the final amount being a compromise between the quantity necessary to achieve an adequate cure of the polymeric binder and that which can be tolerated without undue degradation process.

It has been previously discovered that the polymer of tetrakis(difluoramino)amyl acrylate is a superior binder ingredient. It is a strong polymer readily plasticized by hexakis(difluoramino)propyl ether and a cross linker such as trimethylolpropane trimethylacrylate.

However, it suffers the disadvantage of losing strength upon adding the hexakis(difluoramino)propyl ether plasticizer and with increases in temperature.

Accordingly, the principal object of this invention is to provide a superior binder ingredient for use wth hexakis(difluoramino)propyl ether type propellant compositions.

It is a particular object of this invention to provide a superior binder ingredient through a variation of the tetrakisamyl acrylate structure.

Another object of this invention is to provide a polymer which has good chemical stability with the oxidizer of the propellant composition in which it is employed.

SUMMARY OF THE INVENTION

It has been discovered that the polymer of tetrakis(difluoramino)amyl methacrylate is superior to the polymer of tetrakis(difluoramino)amyl acrylate, and if substituted for the latter in a propellant binder, it considerably improves the binder strength.

DESCRIPTION OF THE PREFERRED EMBODIMENT

The polymer of tetrakis(difluoramino)amyl methacrylate is superior to the polymer of tetrakis(difluoramino) amyl acrylate for use in a propellant binder. The methacrylate version can be made merely by substituting methacrylyl chloride for acrylyl chloride in the synthesis of the acrylate version (for more detail, see U.S. Pat. No. 3,441,550) e.g.,

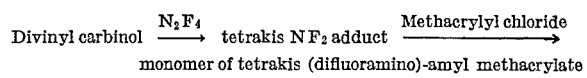

Divinyl carbinol $\xrightarrow{N_2F_4}$ tetrakis $NF_2$ adduct $\xrightarrow{\text{Methacrylyl chloride}}$ monomer of tetrakis (difluoramino)-amyl methacrylate The polymer of tetrakis(difluoramino)amyl methacrylate is then formed from the monomer of tetrakis(difluoramino)amyl methacrylate by copolymerization with trimethylolpropane trimethacrylate or other cross-linker containing three functional groups and a peroxidic polymerization catalyst such as dicyanobenzoyl peroxide.

As used in a propellant composition, the polymerization is deferred until the mixing of all the propellant ingredients has been carried out. The polymerization is effected by curing for about 6 days at about 50° C.

The synthesis of hexakis(difluoramino)propyl ether is effected by reacting 1,2-divinyl ethylene oxide dissolved in carbon tetrachloride with $N_2F_4$ at reaction temperatures in the range of 100° to 150° C. The $NF_2$ group becomes linked to the carbons to give the product having the composition

$CH_2(NF_2)CH(NF_2)CH(NF_2)$
$\qquad OCH(NF_2)CH(NF_2)CH_2(NF_2)$

Other propellant ingredients include a suitable oxidizer, such as ammonium perchlorate and a suitable fuel such as aluminum metal. If desired, other ingredients such as burning rate catalysts may also be incorporated in the propellant composition.

A particular propellant composition which has been found especially desirable consists of 40% solids and 60% binder. The solids composition consists of 78.5% 65μ ammonium perchlorate and 21.5% aluminum. The binder composition consists of 60.1% hexakis(difluoramino)

propyl ether, 36.9% monomer, 2.5% trimethylolpropane trimethacrylate and 0.5% dicyanobenzoyl peroxide.

The physical properties of the polymer of tetrakis(difluoramino)amyl methacrylate have proven to be quite superior to those of the polymer of tetrakis(difluoramino) amyl acrylate.

In particular, the strength of extracted, unplasticized polymer films of the methacrylate version, at room temperature and above, has proven to be better than that of polymer films of the acrylate version.

While this invention has been described with reference to a preferred embodiment thereof, it will be apparent that various modifications and other embodiments thereof will occur to those skilled in the art within the spirit and scope of this invention.

I claim:

1. A solid propellant composition comprising solids and binder material: said solids comprising an ammonium perchlorate oxidizer and a fuel of aluminum; and said binder material including a tri-functional cross-linker, a peroxidic polymerization catalyst, a large amount of plasticizer consisting essentially of hexakis(difluoramino) propyl ether, and tetrakis(difluoramino)amyl methacrylate.

2. The composition of claim 1 wherein said cross-linker is trimethylolpropane trimethacrylate.

3. The composition of claim 1 wherein said peroxidic polymerization catalyst is dicyanobenzoyl peroxide.

4. The composition of claim 1 wherein said cross-linker is trimethylolpropane trimethylacrylate and said peroxidic polymerization catalyst is dicyanobenzoyl peroxide.

5. The composition of claim 1 wherein said cross-linker is trimethylolpropane trimethylacrylate and said peroxidic polymerization catalyst is dicyanobenzoyl peroxide.

6. The composition of claim 1 wherein said cross-linker is trimethylolpropane trimethylacrylate.

7. The composition of claim 1 wherein said cross-linker is trimethylolpropane trimethylacrylate and said peroxidic polymerization catalyst is dicyanobenzoyl peroxide.

8. The composition of claim 1 wherein said solids make up about 40% of said solid propellant composition and said binder material makes up about 60% of said solid propellant composition.

9. The composition of claim 8 wherein said ammonium perchlorate oxidizer is $65\mu$ ammonium perchlorate of about 78.5% of said solids, said tri-functional cross-linker is trimethylolpropane trimethylacrylate of about 2.5% of said binder material, said peroxidic polymerization catalyst is dicyanobenzoyl peroxide of about 0.5% of said binder material, said hexakis(difluoramino)propyl ether is present in an amount of about 60.1% of said binder material, and said tetrakis(difluoramino)amyl methacrylate is present in an amount of about 369.% of said binder material.

References Cited

UNITED STATES PATENTS

| 3,441,550 | 4/1969 | Zimmerman | 260—89.5 |
| 3,447,323 | 6/1969 | Allan | 149—109 |
| 3,441,549 | 4/1969 | Gardiner et al. | 260—88.3 |
| 3,332,812 | 7/1967 | Guthrie | 149—76 |
| 3,332,811 | 7/1967 | Guthrie et al. | 149—76 |

CARL D. QUARFORTH, Primary Examiner

S. J. LECHERT, Jr., Assistant Examiner

U.S. Cl. X.R.

149—20, 42, 44, 76